Sept. 23, 1952 H. E. CRAWFORD 2,611,836
DENTAL ENGINE CONTROL
Filed Sept. 27, 1949 2 SHEETS—SHEET 1
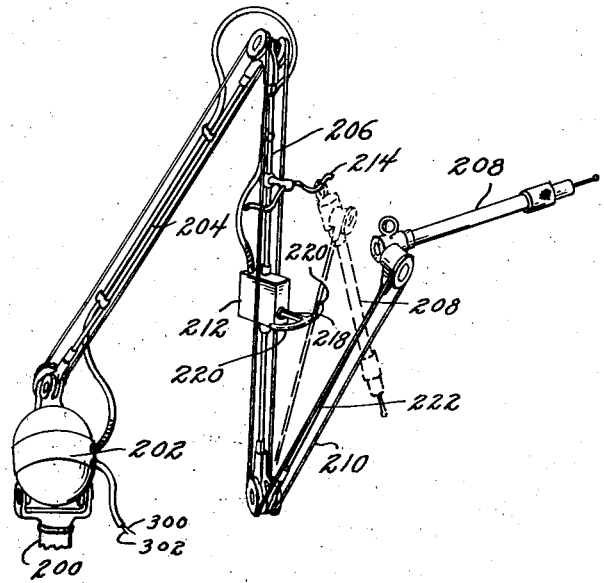
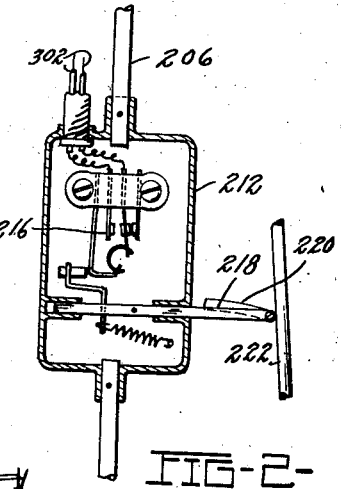
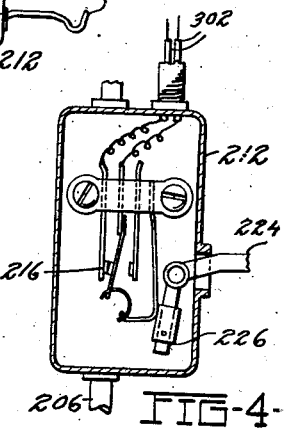
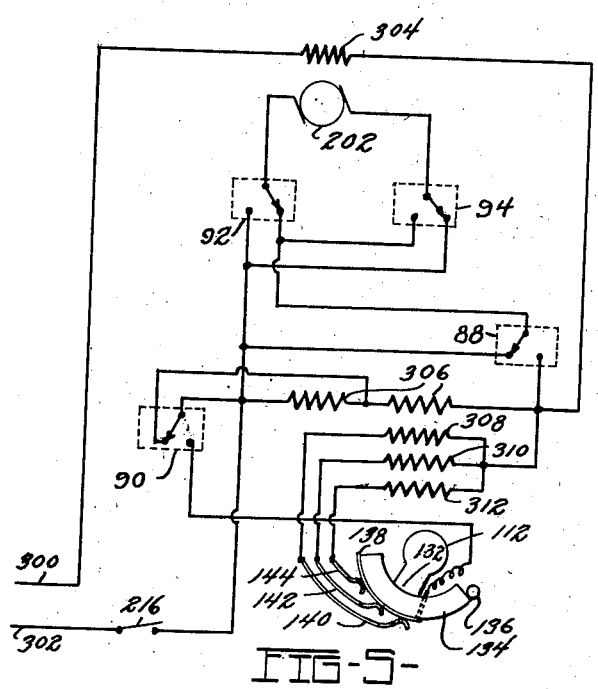
INVENTOR:
HOWARD E. CRAWFORD.
BY
ATTY.

Sept. 23, 1952
H. E. CRAWFORD
2,611,836
DENTAL ENGINE CONTROL
Filed Sept. 27, 1949
2 SHEETS—SHEET 2
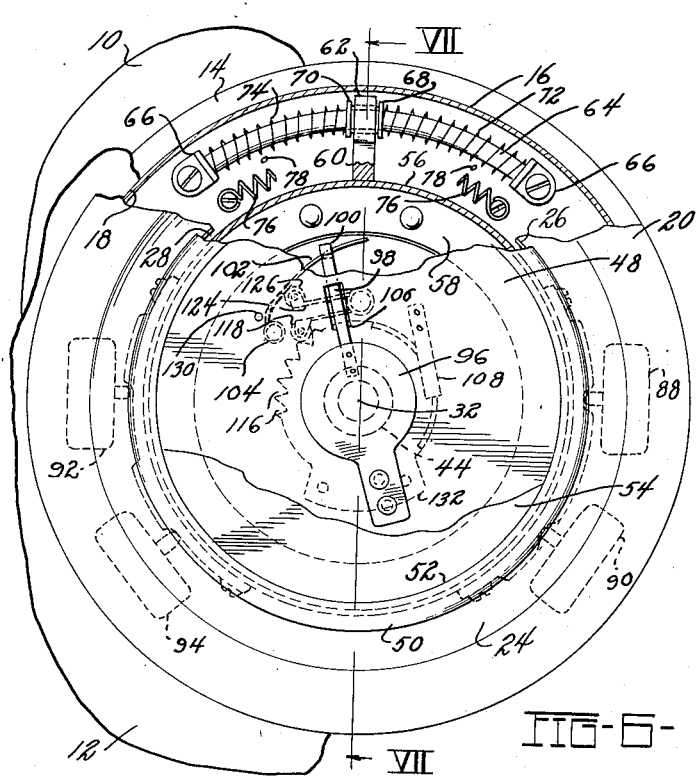
FIG-6-
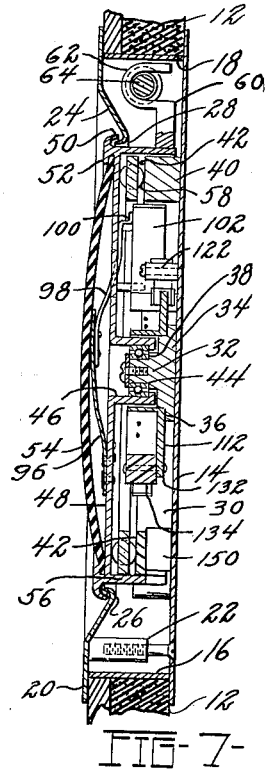
FIG-7-
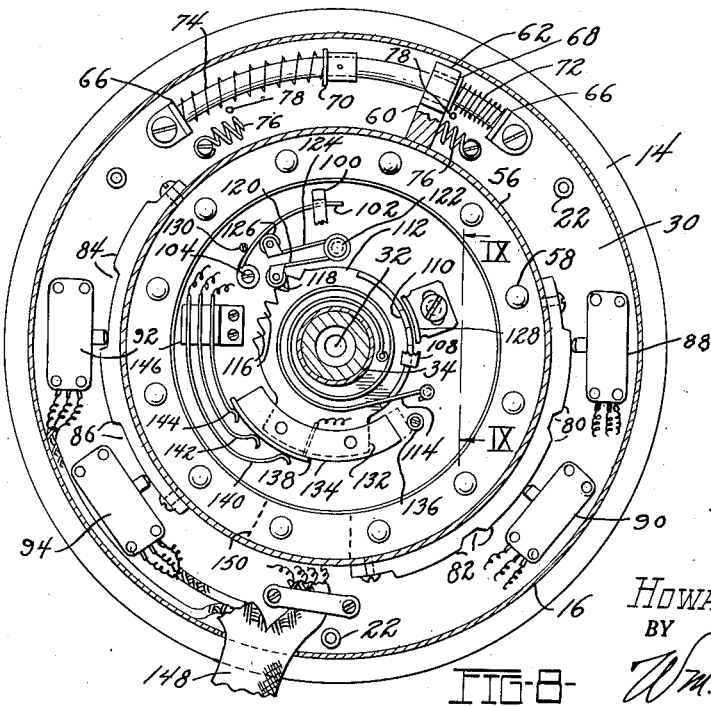
FIG-8-
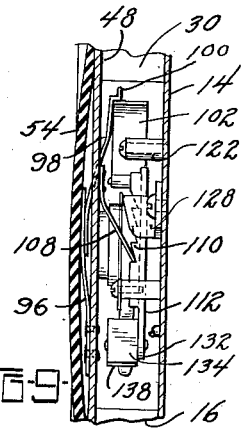
FIG-9-
INVENTOR:
HOWARD E. CRAWFORD.
BY
Wm. O. Ballard
ATTY.

Patented Sept. 23, 1952

2,611,836

UNITED STATES PATENT OFFICE 2,611,836

DENTAL ENGINE CONTROL

Howard E. Crawford, Toledo, Ohio, assignor to Wm. O. Ballard, Toledo, Ohio

Application September 27, 1949, Serial No. 118,160

9 Claims. (Cl. 200—18)

1

This invention relates to the operation and control of tools, particularly in the field of dentistry.

The invention includes a unique combination of three primary developments, an automatic responsive safety device, a foot controlled switch operating mechanism, and an electric circuit incorporating both these features as integral portions thereof.

An object of the invention is the incorporation of a control within the articulated mount of a dental tool which automatically renders the tool inoperative whenever the dentist hangs the tool on the mount in out-of-service position, and which control cuts in the tool driving engine circuit whenever the dentist removes the tool from its hanger.

Another object of this invention is to provide a foot pressure operated switch mechanism for controlling the circuit, permitting a selective control of a predetermined program of circuit operation so long as the foot of an operator retains more than a certain minimum pressure thereon, but automatically resets the mechanism to program starting position whenever the pedal contact pressure is reduced below the minimum.

Another object of this invention is to provide an electric circuit including the above features, which circuit will respond to the operation of said switch mechanism to control the speed and direction of rotation of the tool driving engine.

And another feature of this invention is the combination of tool and foot controlled switches in a circuit to provide a complete and precise control for a dental engine.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a view of a dental engine and an associated articulated tool support incorporating features of the invention;

Fig. 2 is an enlarged detail of the safety switch shown in Fig. 1, parts being broken away;

Fig. 3 is a side elevation of a modified form of the switch arrangement of Fig. 1;

Fig. 4 is an enlarged detail of the switch shown in Fig. 3, parts being broken away;

Fig. 5 is a wiring diagram of a circuit of the invention herein;

Fig. 6 is a plan view of the foot controlled switch operating mechanism incorporated in the circuit;

2

Fig. 7 is a view on the line VII—VII, Fig. 6;

Fig. 8 is a view similar to Fig. 6, the outer portions thereof being broken away; and Fig. 9 is a view on the line IX—IX, Fig. 8.

As described in my application for United States Letters Patent, Ser. No. 107,740, filed July 30, 1949, Foot Control for Dental Engines, of which this application is a continuation-in-part, the invention not only provides a more flexible control of a dental engine, but relieves an operator of certain body strains. For clarity, the detailed description of this improvement is discussed in three sections; the foot controlled switch operating mechanism; the safety switch; and the circuit.

*Foot controlled switch operating mechanism*

The floor 10 which supports a dental chair (not shown) also supports a mat 12 about the base of the chair, which mat covers at least the area normally traversed by the dentist while operating upon a patient occupying the chair.

A housing is provided in the mat and is formed by a base plate 14 resting upon the floor 10 and having side wall 16 upstanding therefrom to extend through an appropriate opening 18 in the mat 12. The height of the wall 16, herein shown as circular, approximates the thickness of the mat 12 so that the cover plate 20, assembled with the base 14 by suitable nut and bolt like connectors 22, will provide a substantially continuous face of the operating surface of the mat. In other words, there will be no hump or extension of the housing above the mat's surface to present any stumbling hazard.

The cover plate 20 has centrally inwardly dished portion 24 extending to a circumferential trough 26 about aperture 28. This housing thus provides chamber 30 within the mat, in which switches and their operating mechanism may be disposed between the floor 10 and the outer or exposed face of the mat 12.

For convenience, appearance and operating efficiency, the entire structure is built about the axis 32 of the chamber 30. To this end, stub axle 34 is fixed centrally to the plate 14 and provides peripheral seats 36, 38. Ring 40 is also disposed within the chamber 30 and fixed to the plate 14 coaxially about the axle 34 in spaced relation thereto. The upper face of this ring 40 provides a circular track 42.

An anti-friction bearing 44 is mounted on the seat 38 which, in turn, carries hub 46 of plate 48 outwardly extending therefrom to be disposed in the nature of a closure for the aperture 28. This plate is provided with a peripheral overhang 50 cooperating with the trough 26 to form a labyrinth against foreign material entering the chamber 30 through the aperture. This plate also has an inwardly extending peripheral overhanging flange 52 providing a seat for arched or dome-shaped flexible pad 54 which pad serves as a foot receiver. This operating pad 54 is engaged by the underside of an operator's foot and may be depressed by axial pressure thereagainst and rotated through frictional engagement. This rotary movement may be either clockwise or counter-clockwise to rotate skirt 56, depending from the plate 48, about the ring 40. Stability is imparted to the structure by means of a ring anti-friction bearing 58 carried on the track 42, in turn supporting the outer edge area of the plate 48.

This pedal construction, when free, is held at a starting or "zero" position from which it may be rotated in either direction. By rotation clockwise, the connected dental engine has its speed controlled in its normal operating direction of rotation. By rotation counter-clockwise, the dental engine is reversed. When pressure on the pedal is released or reduced below a certain minimum, it automatically returns to zero.

This action is attained by an arm 60 fixed with and extending from the skirt 56 terminating in a hook 62 over arcuate bar or rod 64 in turn terminally mounted by brackets 66 on the base plate 14. This hook 62 is flanked by collars 68, 70, and springs 72, 74, about the rod 64 between the collars and rod mountings. One direction of swing of the arm 60 is against the resistance of spring 68 and the opposite swing is against spring 70 while the two springs coact to position the arm at the starting position whenever arm operating pressure is lowered below the pressure exerted by the springs.

Shock absorbing spring structures 76 are positioned on the plate 14 to receive the terminal thrust of the arm 60 thereby cushioning the swing limits of the arms as determined by stops 78. This prevents creeping of the operator's foot over the pad 54 during repeated operation.

The limited reciprocal movement rotates the skirt 56 which carries cams 80, 82, 84 and 86 for controlling switches 88, 90, 92 and 94. For convenience, these cams are divided between a pair of blocks attached to the skirt with two cam faces projected on each block.

Each of the switches in this disclosure have two-way operation.

Switch 88 is a brake control. As shown in Figs. 5 and 6, this switch has closed the armature shorting or braking circuit. With the skirt and cam extent 80 rotated in either direction therefrom, the braking circuit is opened and the switch 88 cuts in a gang resistance for control of the motor speed.

Switch 90 is a resistance control switch. As shown in Figs. 5 and 6, this switch has cut out a portion of the high speed determining resistance simultaneously with the braking short, thereby increasing the effective braking time and reducing any tendency of over-run of the controlled motor. As in operation of switch 88, rotation of the cam extent 82 in either direction, cuts in the full high speed determining resistance and into the gang resistances for control of the motor speed.

Switches 92 and 94 are the motor reversing switches. As shown in Figs. 5 and 6, the circuit is closed therethrough and a clockwise rotation of cam extents 84 and 86 will not affect these switches, but a counter-clockwise rotation throws both switches thereby reversing the circuit therethrough.

In addition to these four switches, another set of switches is also disposed within this structure to be operated in sequence for control of the speed determining gang of resistances.

The mechanism for operating this latter set of switches is controlled by a depression of the flexible dome 54 plus a repeated partial rotation of the depressed dome. By depression of the pad 54, leaf spring 96, mounted on plate 48 thereunder, is also depressed and it in turn shifts extension 98 thereof to cause the offset terminus 100 of such extension to be swung into position for engagement with wing 102, pivotally mounted on pin 104 fixed to the plate 14. The extension 98 penetrates the plate 48 through aperture 106, in its reach from the spring 96, and the offset 100 remains clear of wing engagement unless the pad 52 is depressed and rotated clockwise.

A pawl 108 is attached to the chamber side of plate 48 and disposed to progressively engage teeth 110 on plate 112 mounted on seat 36, to rotate the plate 112 step by step about the axis 32, against the resistance of coil spring 114 having one terminal thereof fixed with the plate 112 and its opposite terminal fixed to the plate 14.

A portion of the periphery of plate 112, remote from the teeth 110, is provided with a series of notches 116, one for each tooth. These notches provide seats for roller 118 carried by spring arm 120, pivotally mounted on pin 122 also fixed on the plate 14. The arm 120 has an extension 124 also mounting a roller 126 which is positioned to be engaged by the wing 102 when the wing is swung toward axis 32 to the catch or overhang 100. If the wing is held inward, the pressure on roller 126 is transmitted to roller 118 and the seating of the roller 118 in a notch 116 is forceful enough to hold the plate 112 against rotation by the spring 114.

If the wing 102 is free, the spring effect of the arms 120, 124 through their U-shaped arrangement does not hold roller 118 with sufficient engagement force in a notch to prevent the spring 114 from rotating the plate 112 to its starting or "zero" position. The leverage of wing 102 when swung inwardly to engage roller 126 is sufficient to convert the roller 118 into a step-by-step holding device for the plate 112. This is a retractile detent operation.

Now, when the pad is depressed and rotated clockwise, the catch 100 engages the wing 102 and causes the roller 118 to act as a step-by-step stop as the plate 112 is rotatively advanced by successive turns of the pad. This is due to the spring finger pawl 108 progressively engaging the teeth 110. The number of advancing steps is determined by the number of teeth on and notches in the plate 112. When the pad 54 expands, the latch 100 is released and pressure removed from roller 118, so that spring 114 swings the plate 112 back to starting position. The pawl 108 does not interfere in this return due to its lifted position above the teeth by action of adjustable slide element 128 upon which the pawl rides into and from each tooth engagement.

The plate 112 may be advanced any number of steps within its full cycle and returned after any step by lifting the pressure from the pad 54, or the full cycle may be had by repeated turns of the depressed pad. The action duplicates the technique employed by some dentists in allowing the tool driving mechanism to revert to zero following each operation and then building up the speed through steps to the desired speed for a subsequent operation.

A counter-clockwise turn of the pedal operates the switches 88, 90, 92 and 94 but the plate 112 remains at zero in that there is no driving connection thereto during the movement. In that a single reverse speed answers the requirements of an apparatus of this nature, there is no need of providing a speed changer for reverse although if such were needed, a duplicate arrangement of the driving parts in reverse could be employed.

In the clockwise rotation of the pedal, the wing 102 is swung into position, to be engaged by the catch 100, by means of a pin 130 depending from the plate 48. This pin 130 contacts the outer side of the wing during the initial portion of the pedal movement swinging the same toward the axis 32 with the resultant operation of it and its associated parts as heretofore described.

The plate 112 has ear portion 132, mounting an arcuate insulation block 134, a terminus of which abuts stop 136 as its initial positioning means. The block 134 is faced by a contact plate 138 so dimensioned that the free ends of spring fingers 140, 142 and 144 engage said plate when the block 134 is against the post or stop 136.

The first depression and clockwise swing of the pedal 54 moves said block one step about axis 32. Switches 88, 90, are operated and the plate 138 is of such length that all three fingers 140, 142 and 144 remain in contact therewith. The second depressed pedal clockwise swing advances the plate 138 so that fingers 142 and 144 remain in contact therewith but finger 140 rests on the insulation block 134 clear of the plate.

Successive steps clear the fingers 142 and 144 from the plate 138. Removal of the pressure from the flexible sheet pad 54 during this step-by-step advancement, allows the spring 114 to swing this latter mechanism back to starting position while the pivotally mounted pedal frame is returned to zero position by spring 72.

The spring fingers are conveniently mounted in an insulation bracket 146 fixed to plate 14. All wiring to the various switches may be conducted into the housing through conduit 148 with the wiring to plate 138 and its cooperating switch fingers passing through clearway 150 in the ring 40.

Safety switch

In practice, a safety switch is incorporated in the circuit controlled by the above foot controlled operating mechanism to render the circuit inoperative when a dentist hangs his hand piece in out-of-use position, and to automatically energize the circuit when the tool is lifted from its storage position.

Pedestal or column 200 rising from the floor 10 in its normal position adjacent the dental chair, mounts motor 202, known as a dental engine in the trade, and also supports an articulated tool mounting boom 204 including an intermediate link 206. This boom carries the hand piece 208 embodying a chuck for clutching the various tool elements used by a dentist. A suitable drive 210 extends from the motor 202 to the hand piece.

The link 206 (Figs. 1 and 2) intermediately mounts housing 212 and a hook-like tool support 214 adjacent thereto. Disposed within the housing 212 is a switch 216, herein shown as of the rolling split-ring type wherein the contact terminals are opened and closed by a reciprocal movement of plunger 218. This switch controls the current flow through one of the power lines to the motor 202.

The outer or exposed portion of the plunger 218 is of T-form to provide arms 220 which afford the desired length of contact for operating the plunger. When the hand piece 208 is hung in out-of-use position on the support 214, a link 222 adjacent the tool contacts and shifts the plunger structure 218, 220, causing the switch 216 to open thereby breaking the power circuit to the motor as well as to the foot control. Removal of the tool from the support permits the switch 216 to automatically close.

The support and switch mechanism may be combined into a unitary structure (Figs. 3 and 4). The plunger 218 is replaced by a hook 224 pivotally mounted in the housing 212. The hook 224 may be used as the tool receiver or hanger and when the hand piece is hung thereon, counterbalancing arm 226 operates to open the switch 216. When the tool is removed from the hook, the switch automatically closes.

In practice, a dentist is in attendance whenever the tool is removed from the boom and the floor mechanism controlled circuit energized. When the dentist leaves the chair area, the tool is stored and this storage renders the circuit inoperative so that walking over or other disturbance of the pedal will have no effect upon the motor 202.

The circuit

A circuit adapted to include and utilize the various switches in their cooperative relation is shown in Fig. 5. Power is supplied from any suitable source by lines 300, 302, the line 300 extending to field windings 304 of the motor 202 and the line 302 to switch 216 and therefrom through the foot controlled switches and resistance gang to the commutator.

A gang of resistances 306, 308, 310, and 312, are shown herein, which may be disposed in some out of the way location, as within the column 200, which provide means for imparting four forward speeds to the motor 202.

The resistance 306 is the maximum or high speed determining resistance and as heretofore described, has a predetermined portion thereof, usually one-half, cut out by the switch 90 when the brake switch 88 shorts the commutator.

The resistances 308, 310 and 312 are cut out in succession as the plate 138 shifts from the fingers 140, 142 and 144 in that order. With all resistances cut in, the motor is at low speed, and has its speed increased with the cut out of each succeeding switch in direct proportion to the value of the remaining resistances.

Current is supplied to the plate 138 by line 302 through switch 90, when the pedal is rotated away from zero.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. A switch control mechanism for a series of switches having a common contact and a plurality of contact terminals coactive therewith, means for shifting said contact step-by-step to progressively open said switches, means resisting the shift of said contact, a retractile device cooperating with said shifting means for rendering said shift resisting means inoperative, a control therefor including an element axially shiftable and rotatable, mechanism actuated by the axial shift of said element to operate the retractile device, and mechanism operable by the rotation of said element to operate said contact shifting means.

2. An electric switch operating mechanism embodying a support, a frame rotatable on said support, a flexible pad carried by said frame, a rotatable plate mounted on said support providing a contact terminal for the switch, mechanism operable by successive rotations of said frame to rotate said plate step-by-step from a starting position, mechanism operable by a flexing of said pad to hold said plate at any step from the starting position, and means for returning said plate to the starting position whenever the pressure for flexing said pad falls below a predetermined minimum.

3. The structure set forth in claim 2 wherein the mechanism for rotating said contact plate comprises a pawl and tooth engagement therebetween.

4. The structure set forth in claim 2 wherein the mechanism for rotating said contact plate comprises a pawl and tooth engagement therebetween, and means for holding said pawl free from tooth engagement except during the rotating operation.

5. The structure set forth in claim 2 wherein the plate holding mechanism comprises a retractile detent held in plate engaging position so long as the pad is flexed toward its supporting frame.

6. The structure set forth in claim 2 wherein the plate holding mechanism comprises a retractile detent moved into plate engaging position by rotation of said frame and held in plate engaging position by a pad operated latch until pressure on said pad is released.

7. A switch control mechanism for a series of switches having means for operating said switches in a predetermined program, said means including an element movable step-by-step from a starting position, means resisting the movement of said element, a rotatable member, a member mounted thereon and shiftable axially thereto, mechanism operable by the rotation of said member for moving said element step-by-step, and means operable by said axially shiftable member moving in one direction for holding said element at each step, said latter means releasing said element when the axially shifted member moves in the opposite direction.

8. Mechanism for operating a plurality of electric switches in a predetermined program for controlling interrelated functions of a dental engine, said mechanism comprising a base providing an axial support, a member rotatably mounted on said support, a terminal on said member providing a common contact for a plurality of said switches, means for rotating said member step-by-step from a starting position to progressively operate said switches, a frame rotatable on said support coaxially with said member, a connection between said frame and the member rotating means for control thereof by rotation of the frame, an axially shiftable pedal on said frame, a latch controlled by said pedal for selectively holding the rotated member away from its starting position, and means for returning said member to its starting position upon release of said latch.

9. Mechanism for controlling the switches in a circuit for operating a dental engine, a support, a plate axially rotatable about said support, an adjacent coaxially rotatable frame, a pawl and tooth connection between said plate and frame operable to progressively rotate said plate from a starting position step-by-step by successive partial rotations of said frame, means defining the possible limits of the frame rotation, a retractile detent mechanism coacting with said plate to hold said plate in any step away from the starting position, means operable to render said detent inoperative, means returning said plate to starting position when the detent is inoperative, a pedal on said frame, mechanism operable by said pedal to control said detent, a multiple switch operating element carried by said plate for controlling a portion of the switches in said circuit, and a multiple switch operating element carried by said frame for controlling another portion of said switches in said circuit.

HOWARD E. CRAWFORD.

REFERENCES CITED

The following references are of record in the file of this patent:

UNITED STATES PATENTS

| Number | Name | Date |
| --- | --- | --- |
| 543,855 | Denison | Aug. 6, 1895 |
| 603,524 | Coachman | May 3, 1898 |
| 1,040,577 | Pieper et al. | Oct. 8, 1912 |
| 1,856,869 | Grimme | May 3, 1932 |
| 2,114,196 | Tritle | Apr. 12, 1938 |
| 2,404,644 | Loewe | July 23, 1946 |
| 2,482,550 | Koertge et al. | Sept. 20, 1949 |